(12) United States Patent
Olsen

(10) Patent No.: US 12,116,747 B2
(45) Date of Patent: Oct. 15, 2024

(54) SUBSEA FOUNDATIONS

(71) Applicant: Subsea 7 Norway AS, Stavanger (NO)

(72) Inventor: Christian Linde Olsen, Stavanger (NO)

(73) Assignee: SUBSEA 7 NORWAY AS, Stavanger (NO)

( * ) Notice: Subject to any disclaimer, the term of this patent is extended or adjusted under 35 U.S.C. 154(b) by 74 days.

(21) Appl. No.: 17/620,066

(22) PCT Filed: Jun. 16, 2020

(86) PCT No.: PCT/EP2020/066643
§ 371 (c)(1),
(2) Date: Dec. 16, 2021

(87) PCT Pub. No.: WO2020/254333
PCT Pub. Date: Dec. 24, 2020

(65) Prior Publication Data
US 2022/0316170 A1    Oct. 6, 2022

(30) Foreign Application Priority Data
Jun. 17, 2019 (GB) ........................ 1908655

(51) Int. Cl.
*E02D 27/52* (2006.01)
*F16L 1/16* (2006.01)

(52) U.S. Cl.
CPC .............. *E02D 27/525* (2013.01); *F16L 1/16* (2013.01)

(58) Field of Classification Search
CPC ........... E02D 27/52; E02D 27/525; F16L 1/16
See application file for complete search history.

(56) References Cited

U.S. PATENT DOCUMENTS 4,405,257 A * 9/1983 Nielsen .................. E02B 3/127
405/18
6,004,072 A * 12/1999 Cunningham .......... F16L 41/06
285/31

(Continued)

FOREIGN PATENT DOCUMENTS

| AU | 2020299844 A1 * | 1/2022 | ............. E02B 17/00 |
| CN | 105569071 A * | 5/2016 | ............. C04B 28/04 |

(Continued)

*Primary Examiner* — Frederick L Lagman
(74) *Attorney, Agent, or Firm* — MATTINGLY & MALUR, PC

(57) ABSTRACT

A method of constructing a sliding subsea foundation includes embedding at least one mass of rocks in seabed soil and placing a sliding mudmat on the seabed over the or each mass of rocks. The rocks can be lowered into a cavity in the seabed by dumping the rocks into the cavity or when contained within a gabion that is inserted into the cavity. Alternatively, a gabion containing the rocks can penetrate the seabed soil, driven by self-weight or additionally by a deadweight bearing on the gabion. The gabion can be lowered toward the seabed suspended from the deadweight. The deadweight can be removed and recovered after the gabion has been embedded in the seabed. The mass of rocks is embedded within an area of excursion of the mudmat to ensure that the mudmat will lie directly above the mass of rocks at any position within the area of excursion.

20 Claims, 7 Drawing Sheets

(56) References Cited

U.S. PATENT DOCUMENTS

| | | | |
|---|---|---|---|
| 8,425,154 B1 * | 4/2013 | Lugo | F16L 1/26 |
| | | | 166/347 |
| 2005/0084338 A1 * | 4/2005 | Skeels | E02D 27/52 |
| | | | 405/226 |
| 2016/0169414 A1 * | 6/2016 | Ayestaran Basagoitia | ................. |
| | | | F16L 1/20 |
| | | | 405/173 |
| 2021/0277619 A1 * | 9/2021 | Liu | E02D 27/525 |

FOREIGN PATENT DOCUMENTS

| | | | | |
|---|---|---|---|---|
| CN | 108222057 B | * | 10/2019 | E02D 15/06 |
| FR | 3029945 A1 | * | 6/2016 | E02D 27/52 |
| GB | 2487578 A | * | 8/2012 | E21B 41/0007 |
| KR | 20180026234 A | * | 3/2018 | |
| KR | 101872929 B1 | * | 6/2018 | |
| WO | WO-2018111120 A1 | * | 6/2018 | E21B 33/035 |

\* cited by examiner

SUBSEA FOUNDATIONS

This invention relates to foundations for heavy subsea structures placed on soft seabed soils, such as accessories incorporated in deep-water pipelines used in the subsea oil and gas industry. The invention relates particularly to techniques for providing foundations for pipeline accessory structures such as pipeline end terminations and in-line tee assemblies.

Subsea pipelines are routinely fitted with accessories during fabrication and installation to provide operational flexibility, to create desired field layouts and to support future field extensions. Such accessories may be disposed at the ends of a pipeline and at positions along its length. They include in-line tee assemblies (ILTs or ITAs), pipeline end manifolds (PLEMs), pipeline end terminations (PLETs, sometimes called flowline end terminations or FLETs), tie-in branches, valves, connectors, wyes, tees, shutdown valves, pigging connections, pig-launching and pig-receiving equipment and other subsea structures.

An in-line tee or ILT is a transition device that is used on pipelines and flowlines carrying production oil/gas or water injection fluids. It is a subsea hub for connection to another system, which may be a manifold, a wellhead or a PLET. An ILT is installed in-line with a pipe such as a flowline pipe; it may, for example, effect a connection between the flowline and a wellhead via a subsea jumper or spool. An ILT typically weighs several tons. Larger accessories such as PLETs may weigh tens of tons at least.

Once on the seabed, the weight of an accessory must not be borne by the pipe that is attached to the accessory. The accessory must instead be supported by a foundation that provides an interface with the seabed, especially where the accessory is laid on a soft, muddy seabed as is common in deep- and ultradeep-water locations. While supporting the weight of the accessory and resisting external loads, the foundation must keep the accessory and the attached pipes stable by resisting rotation and excessive lateral movement and must also avoid excessive settlement into the seabed.

Conventional subsea foundations are of two main types, namely mat foundations and pile foundations.

Mat foundations, typically known in the art as mudmats, are generally flat and are designed to lie on the seabed in a substantially horizontal plane to spread the weight load that they carry in use. A mudmat typically comprises a horizontal top plate, which is usually rectangular. An example is shown in WO 2008/155747. Mudmats may also be paired, one each side of the pipeline, and are typically about 5 m to 10 m in width and about 5 m to 20 m in length. The principle of a mudmat is to provide a bearing area that is sufficient to avoid or to minimise embedment of the foundation into the seabed.

Allowing an accessory to move relative to the seabed provides a degree of freedom to the pipeline, which is therefore less prone to buckling caused by compressive stress arising from thermal expansion or other displacement. Thus, mudmats can be designed to slide horizontally across the seabed, for example to accommodate thermal expansion and contraction that causes a supported pipeline to lengthen and shorten due to temperature fluctuations between operation and shut-down. Alternatively, mudmats can be designed to remain substantially static on the seabed, for example by adding a vertical peripheral skirt around the top plate that embeds into and engages with the seabed soil. In that case, there may be provision for the supported accessory to move to a limited extent with respect to the mudmat.

A mudmat foundation has to cope with the elevated centre of gravity of the accessory it supports and the torque that may be applied by jumper or spool pipes attached to the accessory, while keeping the accessory and the pipe stable without becoming embedded in the seabed.

In principle, therefore, mudmats should be as long and wide as possible to define a large base area. However, there are limits on mudmat size imposed by considerations of cost, weight and ease of installation. In this respect, pipeline installation is not solely a pipelaying activity but also involves handling and lowering accessories attached to the pipe. Consequently, the overall speed of pipeline installation is not determined simply by the rate at which a pipelaying vessel can fabricate and lay pipe, but also by the ability of the vessel to install accessories and mudmat foundations as part of the pipeline.

Large mudmats require a correspondingly large amount of steel for their construction, which adds to their cost and to the challenges of installing them. In particular, large mudmats are challenging to lower into the sea through a turbulent splash zone near the surface. Large mudmats also tend to make inefficient use of their full contact area if they are installed on an uneven seabed. However, the main constraint on the size of a mudmat is the capability of a pipelaying vessel that installs mudmats with their related accessories as part of a subsea pipeline. In particular, if an accessory is launched from a vessel with mudmats already fitted to it, the pipelaying equipment on the vessel has to allow enough space for the mudmats to pass through.

In this respect, marine pipelaying techniques that involve fabrication of a rigid pipeline on a vessel are generally categorised as either S-lay or J-lay. The S-lay technique, for example, involves welding together successive pipe joints at a series of working stations in a horizontal firing line on the deck of a pipelaying vessel, from which the pipeline is launched into the water over a stinger. A variant of S-lay, known as 'Steep S-lay', is adapted for deep- and ultradeep-water applications by setting the lift-off point of the pipe from the stinger close to vertical.

If an accessory structure is launched into the sea with mudmats already fitted to it, the size and stiffness of the mudmats may not be compatible with the bending radius of the pipe on the stinger. This is a problem in S-lay operations in general but is a particular problem in Steep S-lay operations, where the radius of curvature of the stinger is small and the overbend strain experienced by the pipe is correspondingly large.

The invention may be used in support of S-lay or J-lay operations and also in reel-lay operations, where the pipeline is prefabricated and spooled onto a reel to be unspooled and straightened before being launched into the sea.

To ease the integration of pipeline accessories during pipeline installation, it has been proposed for accessories such as ILTs to be fitted with folding mudmats. Such mudmats pass with the accessory along the firing line of a pipelaying vessel and are overboarded in a compact folded configuration. The mudmats are then opened into a wider deployed configuration upon, or just before, reaching the seabed. An example of this approach is disclosed in WO 2012/101525.

The folding mudmat solution exemplified by WO 2012/101525 is a good way to exploit the available space on a pipelaying vessel. However, the maximum size of an accessory fitted with folding mudmats is still limited to the space that is available along the firing line of the vessel, meaning that the available mudmat area may not be sufficient to support a heavy accessory.

Another approach is to pass only a part of the accessory structure through open tensioners, grippers or clamps on the firing line of a pipelaying vessel, and then to assemble the full structure, including mudmats, after or downstream of those tensioners, grippers or clamps. However, in addition to limits on the size of structure that may pass along the firing line, the deck layout of the vessel may impose space constraints that hinder or preclude downstream assembly operations.

It is also known to bypass a restriction in the firing line of a pipelaying vessel by passing an accessory over the side of the vessel away from the laying axis and then recovering the accessory to the laying axis downstream of the restriction. This avoids mudmats fitted to the accessory having to pass through the restriction altogether; however, handling a bulky accessory in this way can be a complex and time-consuming operation.

In general, large mudmats add to the expense of fabrication and place challenging demands upon crane capacity and deck space.

Unlike mudmats, piles are generally cylindrical and are elongated vertically to be buried deeply in the seabed soil, in an upright orientation. A mudmat may even be mounted on a pile, as shown in WO 2018/111120, which provides additional bearing capacity.

Piles are intrinsically designed to resist any horizontal movement across the seabed, although they may be surmounted by a docking system that allows for some horizontal movement of the structure being supported. Anchored solutions comprising piles may be preferred on soft soils. For example, JP S 59-130913 teaches using grouted piles to reinforce soils below heavy structures underwater. However, such a solution would be complex to install in deep water and is designed to resist, rather than to permit, horizontal sliding movement of the supported structure.

Another approach to reinforcing a subsea foundation is to deposit a large rock berm on the seabed, for example with an area of 20 m×20 m and a thickness of 1.5 m. This is challenging and expensive.

It is against this background that the invention has been devised. In one aspect, the invention provides a method of constructing a sliding subsea foundation. The method comprises: embedding at least one mass of rocks in seabed soil; and placing a sliding mudmat on the seabed over the or each mass of rocks.

The rocks may be lowered into a cavity in the seabed soil, for example by dumping the rocks into the cavity to form the mass of rocks or by inserting the rocks into the cavity when contained within at least one gabion. A gabion is a basket or cage of wire mesh or netting filled with rocks as disclosed, for example, in EP 2581499.

The seabed soil may be penetrated with at least one gabion containing the rocks. Penetration of the or each gabion may be driven by self-weight of the gabion, optionally supplemented by a penetration driver such as a deadweight that bears on the or each gabion. In that case, the or each gabion may be lowered toward the seabed suspended from at least one deadweight or other penetration driver, which may then be removed from the or each gabion after embedding the or each gabion in the seabed.

Conveniently, a plurality of gabions may be embedded in the seabed in adjoining or stacked relation.

Discrete masses of rocks may be embedded in the seabed at locations mutually spaced across the seabed, whereupon the sliding mudmat may be placed on the seabed to span the spacing between those masses of rocks.

The method of the invention may comprise: determining an area of excursion of the mudmat on the seabed; and then embedding the or each mass of rocks in the seabed within the area of excursion. The or each mass may be embedded at a position, or positions, that ensures that at least part of the mudmat will lie directly above at least part of at least one mass of rocks when the mudmat is at any position within the area of excursion.

Correspondingly, the inventive concept embraces a subsea foundation that comprises at least one mass of rocks embedded in seabed soil to form a support structure and a sliding mudmat placed on the seabed over the support structure. The mass of rocks is man-made, in the sense that it is substantially created by human action rather than by natural processes. The or each mass of rocks may comprise at least one gabion.

The or each mass of rocks may be columnar. More generally, the or each mass of rocks may have a height in a vertical direction that is greater than at least one width dimension of the mass in a horizontal direction. It is also possible for the or each mass of rocks to be elongated in a horizontal direction.

A pipeline suitably follows a path that extends over the mudmat. In that case, the support structure may comprise first and second discrete masses of rocks that are embedded in the seabed at locations mutually spaced along the path of the pipeline. The or each mass of rocks may also be elongated horizontally in a direction transverse to the path of the pipeline.

When installing heavy pipeline accessories on a soft seabed, the mudmat foundation that can be installed from an available pipelaying vessel may be too small to support the accessory while handling the loads that will be experienced in use of the pipeline. The invention allows the footprint of the foundation to be reduced, making it possible to choose from a wider selection of pipelaying vessels to install such accessories. Alternatively, for a given foundation footprint, the size and weight of the accessory can be increased in comparison with conventional sliding foundations. The invention may also be of benefit for towheads of pipeline bundles landed on very soft clay.

Embodiments of the invention provide a support for a sliding foundation, such as a horizontal mat, on a soft seabed. The support comprises at least one, preferably at least two, rock columns embedded in the seabed. The or each rock column may comprise a gabion or an assembly or combination of gabions.

Embodiments of the invention also implement a method to reinforce soft seabed soil for supporting a sliding underwater foundation, the method comprising the steps of: building at least one rock column in the seabed; and installing the sliding foundation to cover the or each rock column at least partially.

The rock column may comprise at least one gabion that is lowered onto or close to the seabed, for example by a crane or winch, and then left to penetrate the soil under gravity. The or each gabion may penetrate the soil under its own weight or under the additional weight of a clump weight that bears on the gabion. The rock column may instead comprise rocks that are dumped into a bore or trench drilled or dug into the seabed.

A preliminary step may comprise calculating a target box for the sliding foundation and its possible displacements with time, and then selecting the quantity and position of the rock columns so that the foundation is always supported by at least one rock column if displaced within the target box.

Preferred embodiments of the invention push one or more gabions, or gabion-type structures, into the seabed before installing a foundation on top of the or each gabion. The gabions create a shorter flow path for excess pore water to drain and also strengthen the seabed soil.

Optionally, a system to install a gabion may comprise a deadweight to push the gabion into the seabed soil and a release mechanism to free the deadweight, leaving the gabion embedded in the seabed. In this way, the gabion may lowered under the deadweight, which is used to help the gabion to penetrate into the seabed before the deadweight is released from the gabion and recovered to the surface, leaving the gabion behind. The release mechanism may be operable remotely, for example using an ROV.

The gabion solution requires no fabrication, other than optional assembly with a deadweight via a release mechanism. Minimal crane capacity and very little deck space is needed. Any corrosion or disintegration of the cage of the gabion after installation is not a problem because the load-bearing capacity of the gabion arises primarily from the rocks within the cage, and not from the structure of the cage itself.

In summary, the invention provides techniques for constructing a sliding subsea foundation by embedding at least one mass of rocks in seabed soil and placing a sliding mudmat on the seabed over the or each mass of rocks. The rocks may be lowered into a cavity in the seabed by dumping the rocks into the cavity or when contained within a gabion that is inserted into the cavity. Alternatively, a gabion containing the rocks may penetrate the seabed soil, driven by self-weight or additionally by a deadweight bearing on the gabion. The gabion may be lowered toward the seabed suspended from the deadweight. The deadweight may be removed and recovered after the gabion has been embedded in the seabed.

The mass of rocks may be embedded within an area of excursion of the mudmat to ensure that the mudmat will lie directly above the mass of rocks at any position within the area of excursion.

In order that the invention may be more readily understood, reference will now be made, by way of example, to the accompanying drawings in which.

Figure 1A:
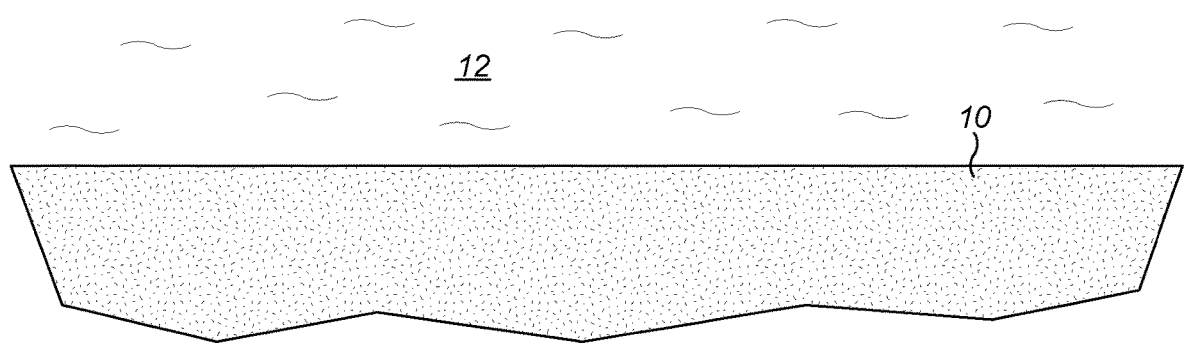
FIGS. 1a to 1f are a sequence of schematic sectional side views that show the preparation of a support structure, in accordance with the invention, for a sliding mudmat foundation of an inline pipeline accessory.
Figure 1B:
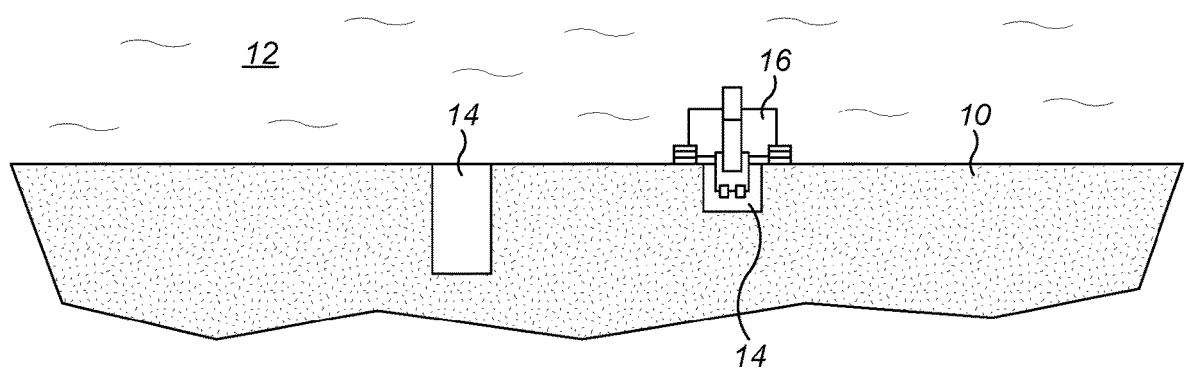
Figure 1C:
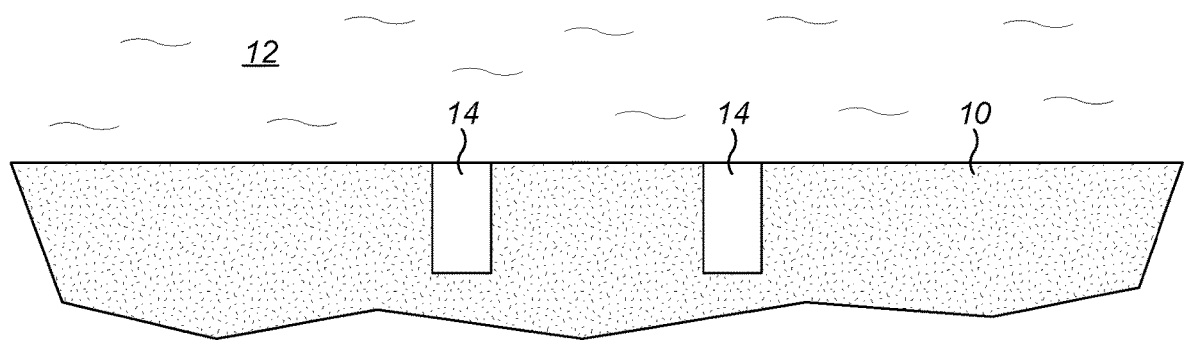

Referring firstly to the sequence of views shown in FIGS. 1a to 1f of the drawings, a soft seabed 10 of silt or clay soil in deep water 12, as shown in FIG. 1a, is firstly excavated to form mutually-spaced, discrete cavities 14 as shown in FIGS. 1b and 1c.

Specifically, FIG. 1b shows a subsea excavator 16 that has already excavated a cavity 14 in the seabed 10 in the form of a first trench and is in the process of excavating another cavity 14 in the form of a second trench spaced across the seabed 10 from the first trench. The open-topped cavities 14 are shown completed in FIG. 1c.

Each cavity 14 has a depth greater than its width. In top plan view, each cavity 14 may be of similar width in mutually-orthogonal horizontal directions or, substantially, rotationally symmetrical. Alternatively, each cavity 14 may be elongate in a horizontal direction, hence having a length greater than its width and possibly also greater than its depth, for example with a generally rectangular shape in top plan view or being rotationally asymmetrical.

A drill or auger could be used to dig the cavities 14 instead of the excavator 16, in which case the cavities 14 could be circular-section bores. However, if desired, a series of overlapping conjoined bores could be drilled in the seabed 10 on parallel vertical axes to form a cavity 14 that is horizontally elongate.

Figure 1D:
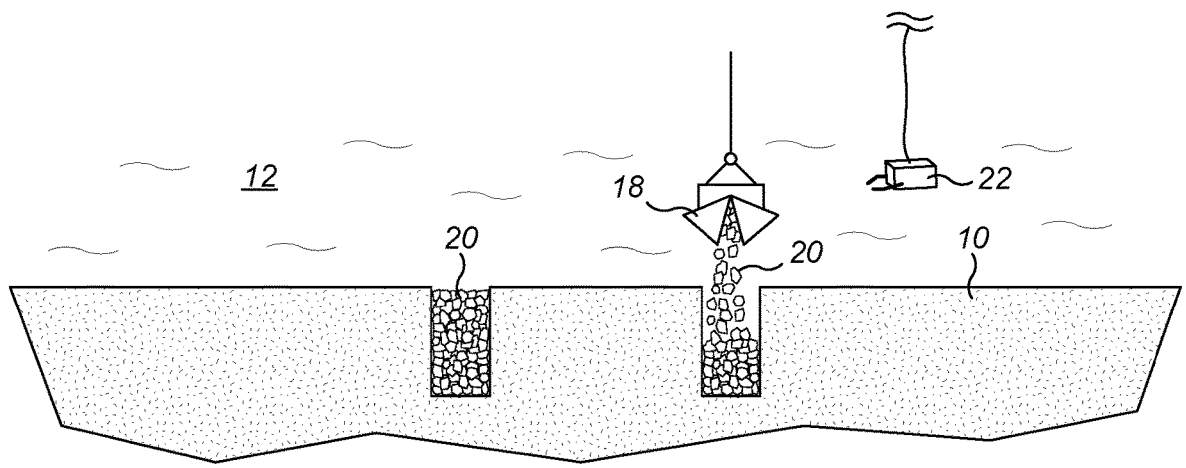
Figure 1E:
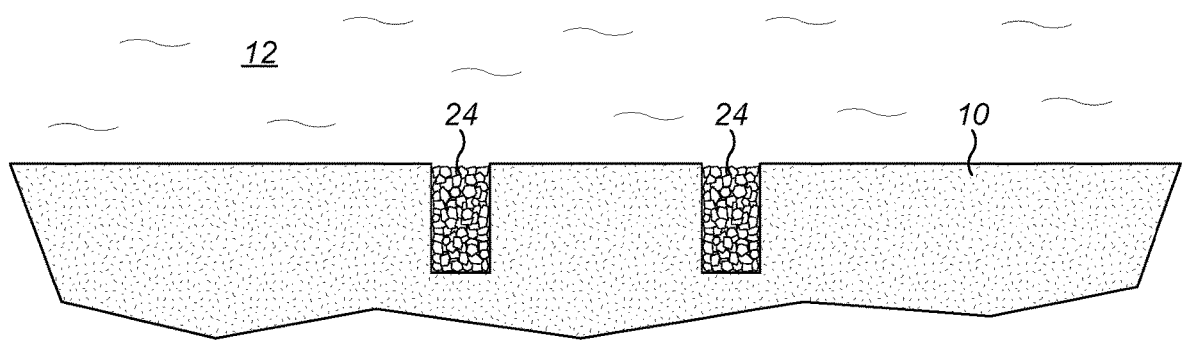

In FIG. 1d, a rock dumper 18 suspended from a surface vessel is shown having filled the first cavity 14 with rocks 20 up to the level of the seabed 10 and is now in the process of filling the second cavity 14 with rocks 20. An ROV 22 is shown monitoring the rock-dumping operation. FIG. 1e shows the rock-dumping operation now completed, with both cavities 14 filled with rocks 20 to the level of the seabed 10. This creates a foundation support comprising mutually-spaced, discrete, man-made pillars or columns 24 of rock that are buried or embedded in the seabed 10. Each rock column 24 is taller than it is wide.

Optionally, the masses of dumped rocks 20 may be compacted, after dumping, to increase the density, integrity and compressive strength of each rock column 24. Also optionally, a layer of soil of the seabed 10 could be spread over the top of each rock column 24.

Figure 1F:
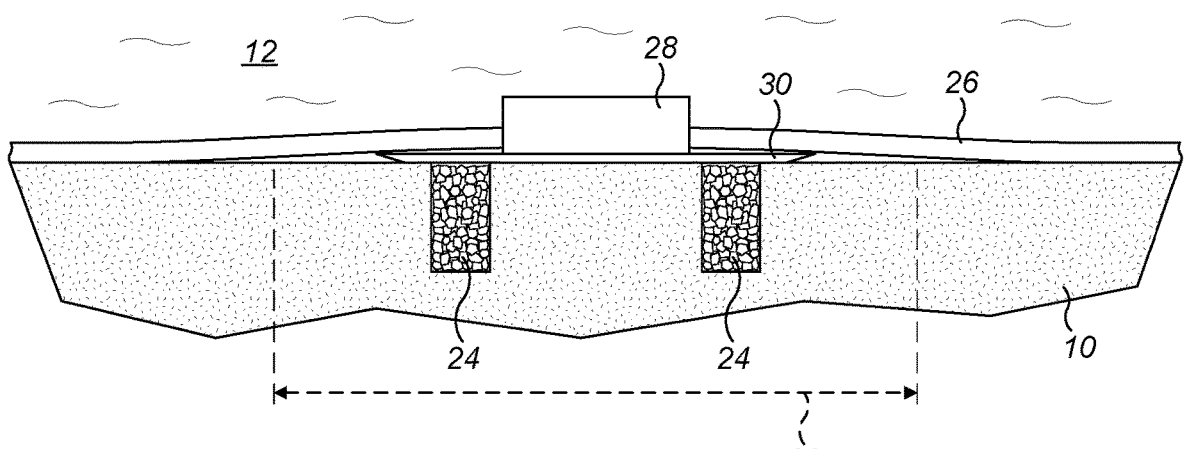
Figure 2:
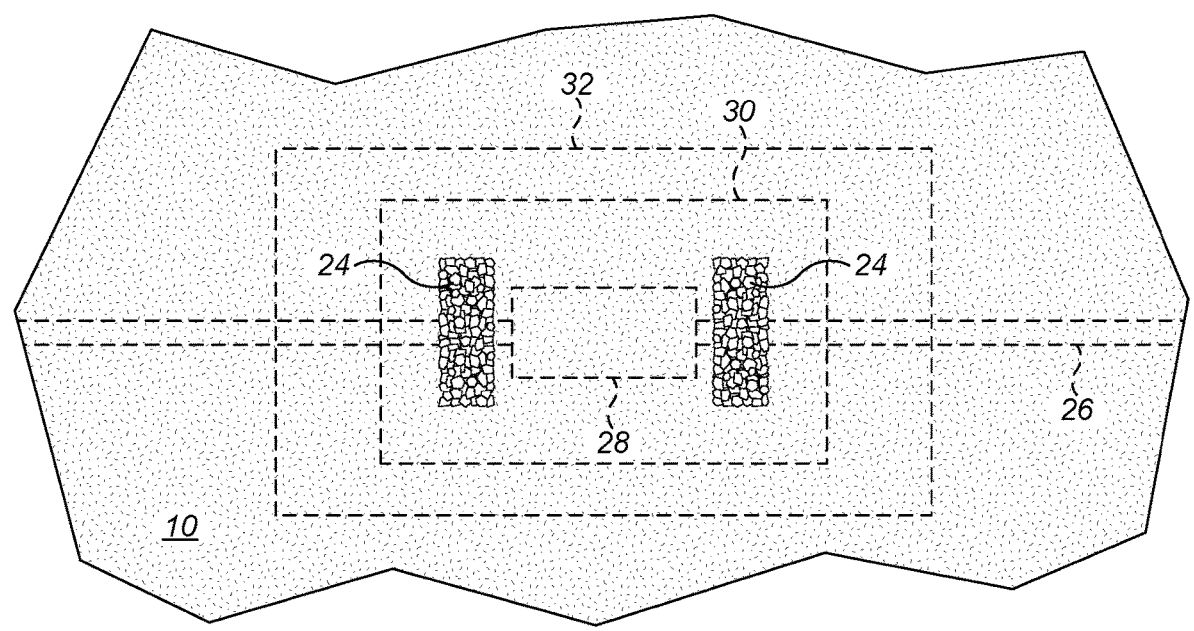
FIG. 2 is a plan view of the support structure beneath the mudmat foundation and the accessory.

FIG. 1f and the corresponding plan view of FIG. 2 show a pipeline 26 now laid on the seabed 10 above the rock columns 24 of the foundation support. The pipeline 26 may have been laid by any conventional pipelaying technique such as S-lay, J-lay or reel-lay. The pipeline 26 bridges the gap between the rock columns 24 and extends across the seabed 10 beyond the rock columns 24. Thus, the rock columns 24 are spaced longitudinally with respect to the length of the pipeline 26.

The pipeline 26 comprises an accessory 28, in this example an in-line accessory 28 such as an ILT disposed between successive lengths of pipe. A sliding mudmat 30 disposed under the accessory 28 rests on the rock columns 24 and on the seabed 10 between and around the rock columns 24. The rock columns 24 therefore bear some of the weight of the accessory 28 and the mudmat 30 and dissipate those loads into the surrounding soil of the seabed 10 with which the rock columns 24 are engaged.

The weight-bearing contribution of the rock columns 24 allows the mudmat 30 to be significantly smaller than if the rock columns 24 were absent. Yet, there is no greater risk of such a compact mudmat 30 becoming embedded in, and hence being locked relative to, the soft soil of the seabed 10 under the weight of the accessory 28 supported above. The mudmat 30 can therefore slide freely with the supported accessory 28 in response to displacement of the pipeline 26, in particular thermal expansion and contraction causing the accessory 28 to slide longitudinally with respect to the path of the pipeline 26. Consequently, the pipeline 26 is not subjected to buckling stresses that could arise if movement of the accessory 28 was excessively constrained.

In this respect, FIG. 1f shows a range of longitudinal movement of the mudmat 30, characterising a horizontal area of excursion or box 32 in which the accessory 28 and hence the mudmat 30 may be expected to move horizontally in use of the pipeline 26. FIG. 2 shows that the box 32 may also extend horizontally in lateral directions transverse to the path of the pipeline 26, for example if the path of the pipeline 26 across the seabed 10 is curved when viewed from above.

The plan view of FIG. 2 also shows that, in this example, the rock columns 24 are elongated horizontally in a direction transverse to the path of the pipeline 26 to form transverse foundation walls. This ensures that the rock columns 24 continue to support the mudmat 30 even if the mudmat 30 is displaced laterally across the seabed 10. Yet, the rock columns 24 remain compact and so are simple and inexpensive to install.

Figure 3A:
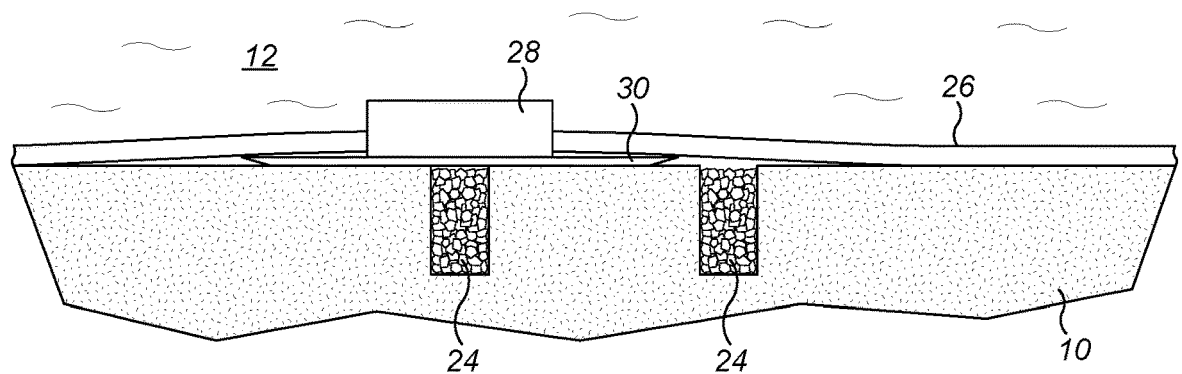
FIGS. 3a and 3b show a range of excursion of the sliding mudmat foundation with respect to the support structure in response to thermal cycling of the pipeline.
Figure 3B:
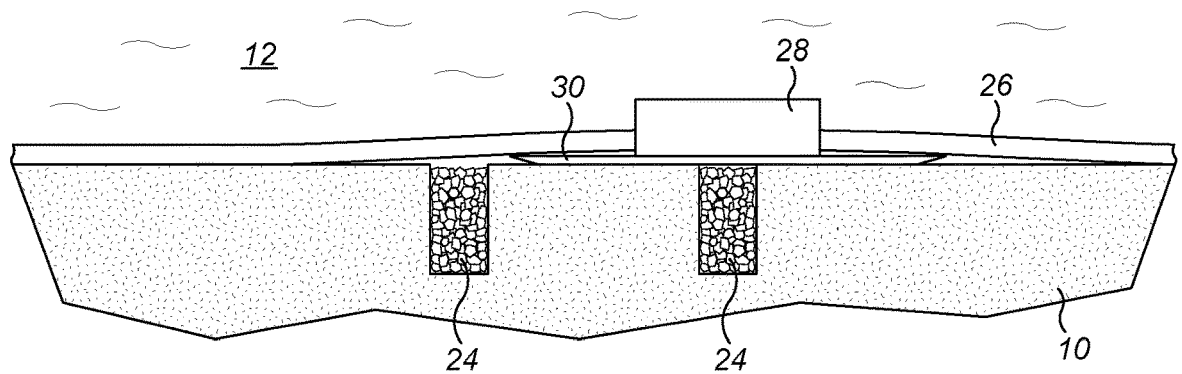

Turning next to FIGS. 3a and 3b, these drawings show the pipeline 26, the accessory 28 and hence the mudmat 30 slid across the seabed 10 to respective longitudinal extremities of the box 32 shown in FIG. 1f and in FIG. 2. It will be apparent that at least one of the rock columns 24 remains underneath the mudmat 30 at each extreme position. The positions, number and mutual spacing of the rock columns 24 are chosen specifically to ensure that the mudmat 30 will always be supported by at least one rock column 24 regardless of where the mudmat 30 may move within the predicted area of the box 32.

Figure 4:
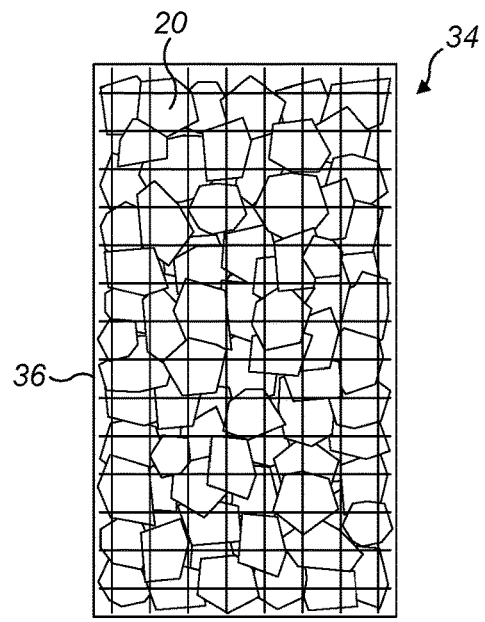
FIG. 4 is a schematic side view of a gabion for use in some embodiments of the invention.

FIG. 4 shows another way of forming and delivering the rock columns 24 that support a sliding mudmat foundation in accordance with the invention. Here, the rock columns 24 are defined by one or more gabions 34 that hold a packed mass of rocks 20 within a surrounding basket or cage 36 of steel wire netting or mesh.

The gabion 34 exemplified in FIG. 4 and the remaining drawings is taller than it is wide and so is capable of forming a rock column 24 by itself. However, two or more gabions 34 could be stacked one on top of each other, laid beside each other or otherwise assembled or brought together to form a rock column 24, depending upon the shape and size of the gabions 34 and of the rock column 24 that is required.

Thus, a gabion 34 could have a different aspect ratio to that shown and may, for example, be substantially as tall as it is wide, or indeed may be shorter than its width. Also, the gabion 34 shown in FIG. 4 has a cuboidal shape but it could have a cylindrical shape, for example with a circular cross-section in a horizontal plane.

The invention contemplates various ways in which gabions 34 may be installed and buried or embedded in the soil of the seabed 10. In this respect, reference will now be made to FIGS. 5a to 5c, FIGS. 6a to 6c and FIG. 7.

Figure 5A:
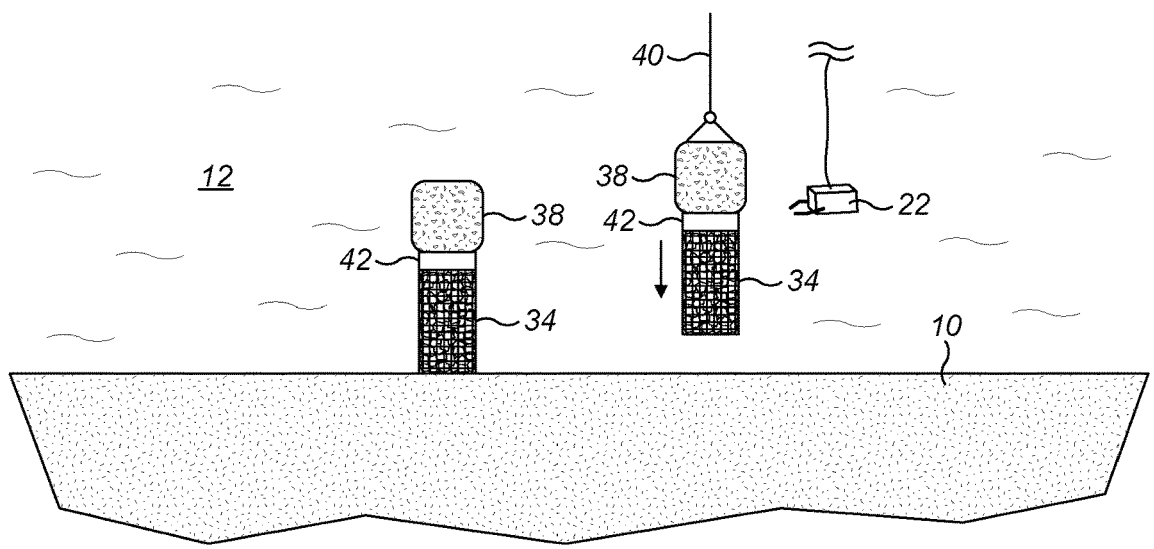
FIGS. 5a to 5c are a sequence of schematic sectional side views that show an alternative technique for preparing a support structure in accordance with the invention, using gabions as shown in FIG. 4.
Figure 5B:
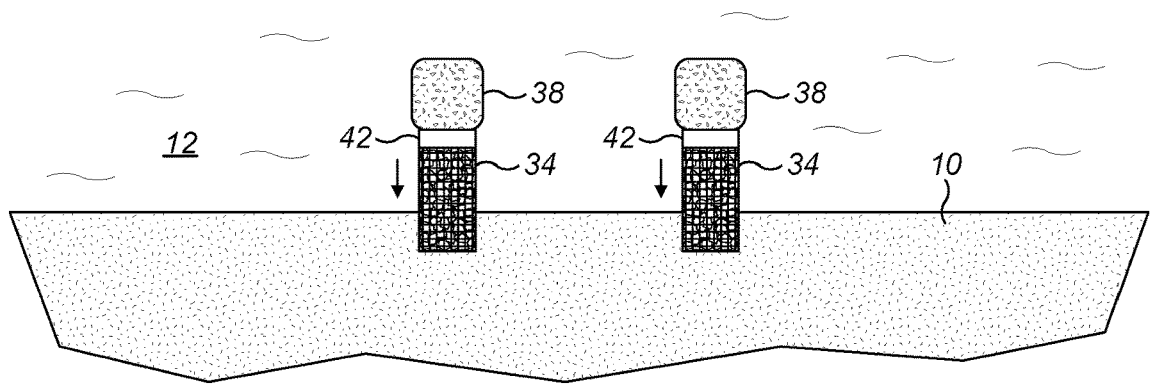
Figure 5C:
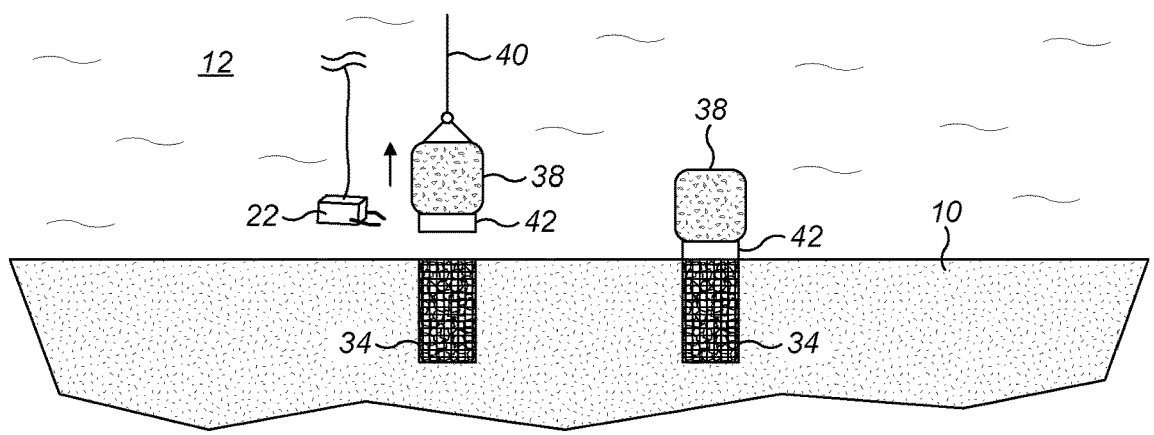

FIGS. 5a to 5c show the use of deadweights 38, for example of concrete, mounted on top of each gabion 34 to force the gabions 34 down into the seabed 10. During installation, the gabions 34 are lowered to the seabed 10 hanging from a crane wire 40 under respective deadweights 38 and are attached to the deadweights 38 by subsea-operable release mechanisms 42.

FIG. 5a shows one of the gabions 34 already lowered to the seabed 10 and the other gabion 34 in the process of being lowered to the seabed 10. An ROV 22 is shown monitoring the lowering operation. Each gabion 34 is surmounted by a respective deadweight 38. A release mechanism 42 is interposed between each gabion 34 and the associated deadweight 38.

FIG. 5b shows the gabions 34 being forced into the soft soil of the seabed 10 under the downward load of their self-weight supplemented by the additional weight of the deadweights 38.

FIG. 5c shows the gabions 34 now fully embedded into the seabed 10. The ROV 22 has operated the release mechanism 42 between one of the gabions 34 and the associated deadweight 38, freeing that deadweight 38 and the release mechanism 42 to be lifted back to the surface. The deadweight 38 on the other gabion 34 can be released and lifted simultaneously, or subsequently.

Figure 6A:
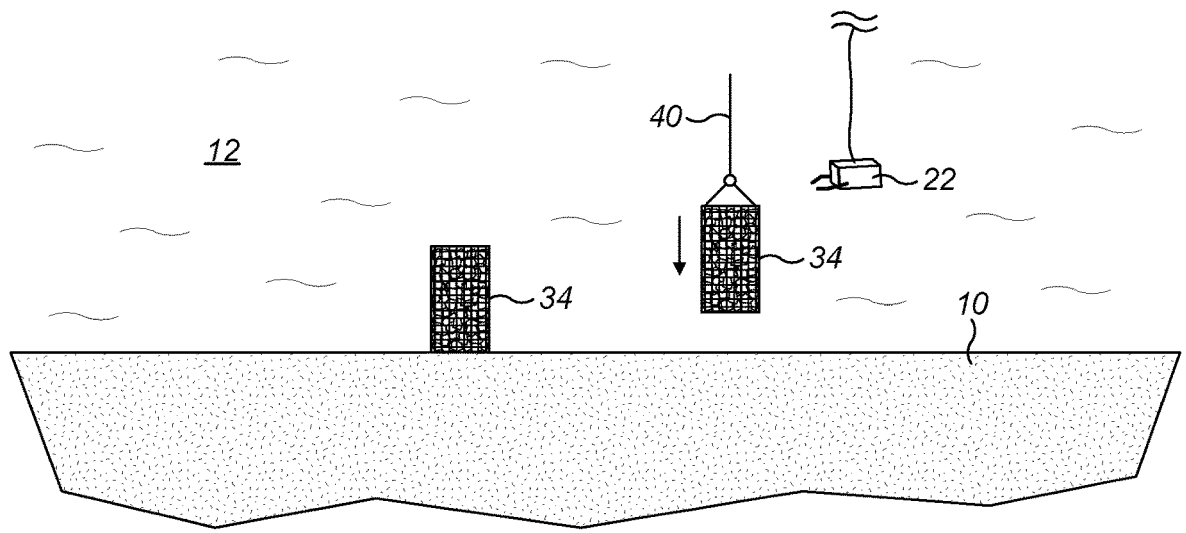
FIGS. 6a to 6c are a sequence of schematic sectional side views that show another technique for preparing a support structure in accordance with the invention, also using gabions as shown in FIG. 4.
Figure 6B:
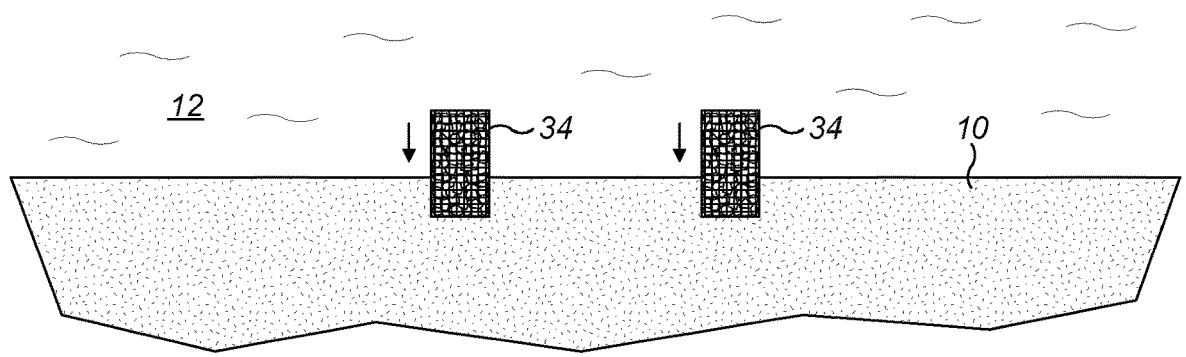
Figure 6C:
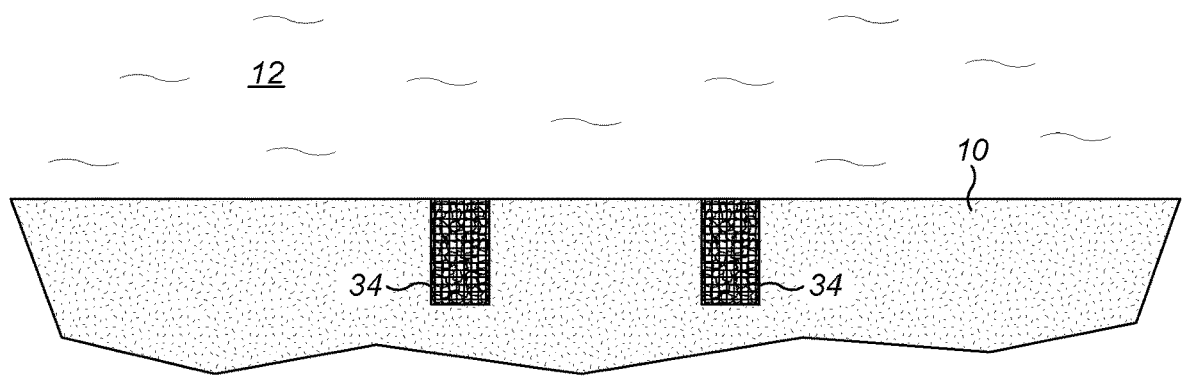

FIGS. 6a to 6c show that gabions 34 could potentially sink and embed themselves into a soft seabed 10 under their self-weight. FIG. 6a shows one of the gabions 34 already lowered to the seabed 10 and the other gabion 34 in the process of being lowered to the seabed 10 on a crane wire 40. FIG. 6b shows the gabions 34 being forced into the soil of the seabed 10 under the downward load of their self-weight. Again, an ROV 22 can monitor the lowering operation and release the crane wire 40 from the gabions 34. FIG. 6c shows the gabions 34 now fully embedded into the seabed 10.

Figure 7:
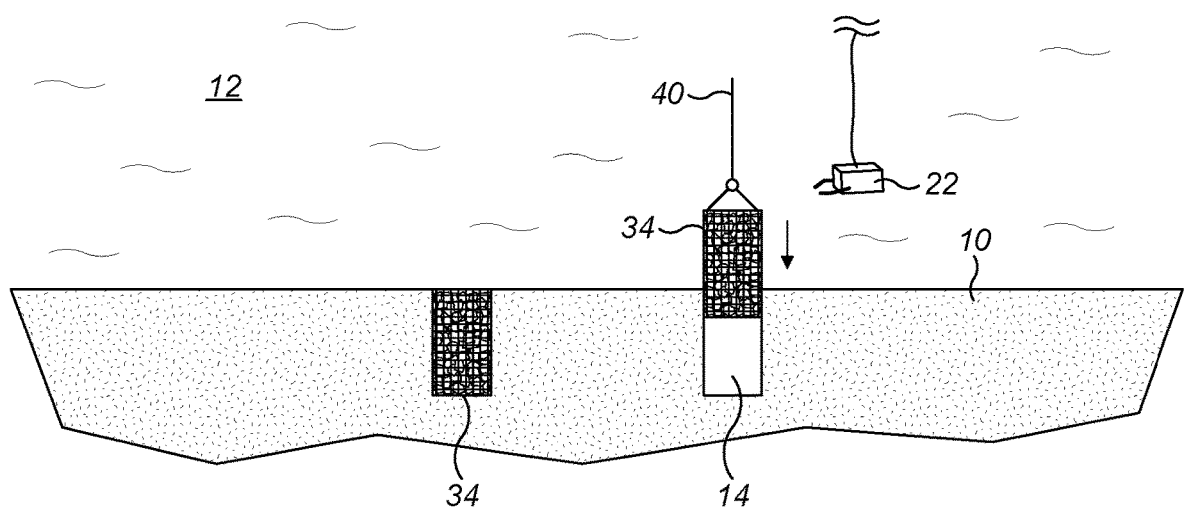
FIG. 7 is a schematic sectional side view that shows another technique for preparing a support structure in accordance with the invention, again using gabions as shown in FIG. 4.

Finally, FIG. 7 shows the possibility of gabions 34 being lowered into pre-excavated cavities 14 in the seabed 10 like those shown in FIG. 1c. Here, one of the gabions 34 has already been lowered into a cavity 14 in the seabed 10 and the other gabion 34 is in the process of being lowered into another cavity 14 in the seabed 10. The horizontal cross-sectional shape and area of the cavity 14 suitably matches the horizontal cross-sectional shape and area of the gabion 34.

When the gabions 34 shown in FIGS. 5a to 5c, FIGS. 6a to 6c and FIG. 7 have been embedded fully into the seabed 10 to form rock columns 24, a pipeline 26 comprising an accessory 28 and a sliding mudmat 30 can be laid above them onto the seabed 10 as shown in FIG. 1f and FIG. 2.

3D finite element modelling has been undertaken to simulate the effect of the invention, assuming: shear strength of soil su=2+1z; a foundation footprint of 10 m×6 m; and a pair of parallel rock columns 24 being 4 m long, 1 m wide and 2 m high, each rock column 24 comprising gabions 34 embedded in the soil. In the model, the foundation was loaded with self-weight of 400 kN and a horizontal load was applied in the longitudinal direction at a height of 2 m above the seabed to reflect a typical PLET-type structure. The analysis revealed an improvement of nearly 50% in displacement of the foundation under load.

Many variations are possible within the inventive concept. For example, rock columns 24 may be spaced not just longitudinally but also at various lateral positions with respect to the path of the pipeline 26.

Two or more gabions 34 could be suspended from, and pressed down by, a single deadweight 38 shared between those gabions 34.

Penetration of a gabion 34 into the seabed 10 could be accelerated by dropping the gabion 34 from a short distance above the seabed 10, hence impacting the seabed 10 with momentum and substantial kinetic energy. A gabion 34 could also be driven into seabed soil with the assistance of a penetration driver that vibrates the gabion 34 or that impacts the gabion 34.

A gabion 34 could be shaped to ease penetration into seabed soil, for example by having a downwardly-tapering shape, at least at a lower or leading end of the gabion 34.

The invention claimed is:

1. A method of constructing a sliding subsea foundation, the method comprising:

embedding first and second discrete masses of rocks in respective first and second cavities in soil of a seabed at locations mutually spaced across the seabed; and placing a sliding mudmat on top of the seabed over the first and second masses of rocks to span the spacing between the first and second cavities.

2. The method of claim 1, comprising lowering the first and second discrete masses of rocks into the first and second cavities.

3. The method of claim 2, comprising dumping the first and second discrete masses of rocks into the first and second cavities to form the mass of rocks.

4. The method of claim 2, comprising inserting the first and second discrete masses of rocks into the first and second cavities when contained within respective first and second abions.

5. The method of claim 4, comprising embedding a plurality of gabions in the seabed in adjoining or stacked relation.

6. The method of claim 1, comprising penetrating the soil of the seabed with at least one gabion containing either the first or second discrete mass of rocks.

7. The method of claim 6, comprising driving penetration of the or each gabion by self weight of the gabion.

8. The method of claim 7, comprising additionally driving penetration of the or each gabion by a deadweight bearing on the or each gabion.

9. The method of claim 8, comprising lowering the or each gabion toward the seabed suspended from at least one deadweight.

10. The method of claim 8, comprising removing the or each deadweight from the or each gabion after embedding the or each gabion in the seabed.

11. The method of claim 1, comprising:

determining an area of excursion of the mudmat on the seabed; and embedding the first and second discrete masses of rocks in the seabed within the area of excursion at positions that ensure that at least part of the mudmat will lie directly above at least part of at least one of the first and second discrete masses of rocks when the mudmat is at any position within the area of excursion.

12. A subsea foundation, comprising:

a support structure comprising first and second discrete masses of rocks embedded in respective first and second cavities in the seabed at locations mutually spaced across the seabed; and a sliding mudmat placed on top of the seabed over the support structure that spans the spacing between the first and second cavities.

13. The foundation of claim 12, wherein the first and second discrete masses of rocks are columnar.

14. The foundation of claim 12, wherein the first and second discrete masses of rocks each have a height in a vertical direction that is greater than a width dimension of the mass in a horizontal direction.

15. The foundation of claim 12, wherein the first and second discrete masses of rocks are elongated in a horizontal direction.

16. The foundation of claim 12, wherein the first and second discrete masses of rocks comprise at least one gabion.

17. The foundation of claim 12, wherein a pipeline follows a path extending over the mudmat.

18. The foundation of claim 17, wherein the first and second cavities are mutually spaced along the path of the pipeline.

19. The foundation of claim 17, wherein the first and second discrete masses of rocks are elongated horizontally in a direction transverse to the path of the pipeline.

20. The foundation of claim 12, wherein:

the mudmat is movable within an area of excursion on the seabed; and the first and second discrete masses of rocks are embedded in the seabed within the area of excursion at positions that ensure that at least part of the mudmat will lie directly above at least part of at least one of the first and second discrete masses of rocks when the mudmat is at any position within the area of excursion.

\* \* \* \* \*